United States Patent
Vorst et al.

(10) Patent No.: US 9,674,038 B2
(45) Date of Patent: Jun. 6, 2017

(54) METHOD FOR AUTOMATICALLY DEPLOYING A NETWORK DEVICE CONFIGURATION

(71) Applicant: ABB TECHNOLOGY AG, Zurich (CH)

(72) Inventors: Philipp Vorst, Manheim (DE); Wolfgang Mahnke, Hettenleidelheim (DE); Christian Messinger, Hirschberg (DE); Georg Gutermuth, Heidelberg (DE)

(73) Assignee: ABB Schwiez AG, Baden (CH)

( * ) Notice: Subject to any disclaimer, the term of this patent is extended or adjusted under 35 U.S.C. 154(b) by 241 days.

(21) Appl. No.: 14/740,845

(22) Filed: Jun. 16, 2015

(65) Prior Publication Data

US 2015/0280988 A1     Oct. 1, 2015

Related U.S. Application Data (63) Continuation of application No. PCT/EP2012/075806, filed on Dec. 17, 2012.

(51) Int. Cl.
G06F 15/177   (2006.01)
H04L 12/24    (2006.01)
H04L 12/12    (2006.01)

(52) U.S. Cl.
CPC .......... H04L 41/0826 (2013.01); H04L 12/12 (2013.01); H04L 41/0866 (2013.01);
(Continued)

(58) Field of Classification Search
None
See application file for complete search history.

(56) References Cited

U.S. PATENT DOCUMENTS

2003/0161348 A1    8/2003  Mills et al.
2004/0123091 A1*   6/2004  Das ................. H04L 29/06
                                                      713/2

(Continued)

FOREIGN PATENT DOCUMENTS

WO    WO 2007/050222 A1    5/2007

OTHER PUBLICATIONS

International Search Report (PCT/ISA/210) mailed on Feb. 22, 2013, by the European Patent Office as the International Searching Authority for International Application No. PCT/EP2012/075806.

*Primary Examiner* — Mohamed Ibrahim
(74) *Attorney, Agent, or Firm* — Barnes & Thornburg LLP (57) ABSTRACT

A method is disclosed for automatically configuring network devices of a data network having at least two configurable network devices, whose configuration parameters are deployable over the data network to the configurable network devices from an initial configuration state to a desired configuration state. At least one of the configurable network devices is from a first type of network devices, whose configuration requires a pre-defined series of at least one intermediate configuration state. A central deployment network device determines the actual state of each configurable network device for comparing with desired states of the configurable network devices, and in case of a difference, determines a subsequent intermediate and or respective subsequent desired configuration state wherein actual states of the configurable network devices are considered.

20 Claims, 5 Drawing Sheets

(52) U.S. Cl.
CPC ...... *H04L 41/0886* (2013.01); *H04L 41/0883* (2013.01); *Y02B 60/34* (2013.01)

(56) References Cited

U.S. PATENT DOCUMENTS

| | | | |
|---|---|---|---|
| 2005/0278453 A1* | 12/2005 | Cherkasova | H04L 29/06027 709/231 |
| 2007/0094410 A1 | 4/2007 | Voigt et al. | |
| 2007/0268515 A1* | 11/2007 | Freund | H04L 67/34 358/1.15 |
| 2007/0268516 A1* | 11/2007 | Bugwadia | H04L 67/34 358/1.15 |
| 2008/0281833 A1* | 11/2008 | Cain | G06Q 10/06 |

* cited by examiner

METHOD FOR AUTOMATICALLY DEPLOYING A NETWORK DEVICE CONFIGURATION

RELATED APPLICATION

This application claims priority as a continuation application under 35 U.S.C. §120 to PCT/EP2012/075806 filed as an International Application on Dec. 17, 2012 designating the U.S., the entire content of which is hereby incorporated by reference in its entirety.

FIELD

The present disclosure relates to a method for automatically configuring network devices of a data network according to a desired device configuration, wherein the data network includes at least two configurable network devices, wherein configuration parameters are deployable over the data network to the configurable network devices and wherein the configurable network devices are configurable from a respective initial configuration state to a respective desired configuration state by deploying.

BACKGROUND INFORMATION

A data or communication network includes devices connected thereto, including both network infrastructure devices like routers and connected devices like automation controllers. It is known that data network configuration tools today provide quite sophisticated functions for configuring network devices, that is, for specifying and deploying the configuration parameters of and to the devices. There can be two types of configuration tools. The first type only configures an individual, specific network device (e.g., via Web interface) and the other one configures several devices. The first type is not further considered as the present disclosure targets the configuration of several devices.

However, a first point is that networks, such as in large automation systems, can include a large number of network devices that differ with regard to type and configuration protocols. A second point is that some configuration parameters affect the communication between the devices in the network and therefore the logical network topology (i.e., connectivity among the devices). Such dependencies are not sufficiently taken into consideration by today's tool landscape.

For example, the situation of network device configuration tools provides the following further restrictions:
  The deployment of configurations has been done device by device, coordinated by a human.
  If the network tool supports the deployment of several configurations in parallel, the deployment has been done isolated for each device, assuming independence of the deployment. That is, it is assumed that configuring the one device does not interfere with the other device being configured simultaneously and vice versa.
  Deploying the configuration of a single device often requires a sequence of subordinate deployment steps until the final configuration is achieved.
  The topology of the network constrains the ordering in which configurations can be deployed to devices. The actual topology of the network may even vary if the network equipment arrives at different points in time, but the devices should be configured before the entire network is fully physically connected as required for the desired target configuration of the network.
  Bulk network tools can discover the topology of the network as reachable by them and do not take the full network into consideration when not all network devices are accessible/visible from the network node(s) that master the configuration process. Particularly when automation systems are designed, this knowledge is available as a system description, even before the hardware arrives.
  Moreover, the subordinate deployment steps at one device can have dependencies to subordinates steps of another device.

In medium-sized data networks, the rollout of configurations is already difficult to overview by a human, often leads to misconfigurations, and is slower than necessary if dependencies between configuration steps are not fully taken into consideration. Configuring a network is therefore a time-consuming effort for human network engineers.

SUMMARY

A method is disclosed for automatically configuring network devices of a data network which includes at least two configurable network devices whose configuration parameters are deployable over the data network to configure the configurable network devices from a respective initial configuration state to a respective desired configuration state, at least one of the configurable network devices being from a first type of network devices whose configuration requires a pre-defined series of at least one intermediate configuration state in between the initial configuration state and the desired configuration state, the method comprising: operating a central deployment network device with a central deployment software-tool running thereon to perform or initiate the following: determining an actual state of each of the configurable network devices; comparing the actual states with respective desired states of the configurable network devices; in case of a difference, determining at least one respective subsequent intermediate or respective subsequent desired configuration state for at least one of the configurable network devices wherein the actual states of the configurable network devices are considered; deploying respective configuration parameters for the respective subsequent intermediate or desired configuration state to the respective configurable network device; and repeating the operation until all configurable network devices are configured as desired.

A system is also disclosed for automatically configuring network devices of a data network having at least two configurable network devices whose configuration parameters are deployable over the data network to the configurable network devices, the configurable network devices being configurable from a respective initial configuration state to a respective desired configuration state, the system comprising: at least one configurable network device of a first type of network devices, whose configuration requires a pre-defined series of at least one intermediate configuration state in between an initial configuration state and a desired configuration state; and a central deployment network device with a central deployment software-tool running thereon which is configured to initiate or perform computer implemented functions which include: determining an actual state of each of the configurable network devices; comparing the actual states with respective desired states of the configurable network devices; in case of a difference, determining at least one respective subsequent intermediate or respective subsequent desired configuration state for at least one of the configurable network devices wherein the actual states of the configurable network devices are considered; deploying respective configuration parameters for the respective subsequent intermediate or desired configuration state to the respective configurable network device; and repeating the operation until all configurable network devices are configured as desired.

BRIEF DESCRIPTION OF THE DRAWINGS

Advantages and features disclosed herein will now be further explained by exemplary embodiments and with reference to the accompanying drawings, in which.

DETAILED DESCRIPTION

A method and a system are disclosed for automatically configuring network devices of a data network according to a desired device's respective network configuration which also takes into consideration dependencies between the network devices during deployment.

According to an exemplary method at least one of the configurable network devices is from a first type of network devices, whose configuration requires a pre-defined series of at least one intermediate configuration state in between the initial configuration state and the desired configuration state, and a central deployment network device with a central deployment software tool running thereon performs or initiates the following functions: determining the actual state of each of the configurable network devices, comparing them with the respective desired states of the configurable network devices, and in case of a difference determining at least one respective subsequent intermediate or respective subsequent desired configuration state for at least one of the configurable network devices wherein the actual states of the configurable network devices are considered, deploying the respective configuration parameters for the respective subsequent configuration state to the respective configurable network device and repeating until all configurable network devices are configured as desired.

Exemplary embodiments include splitting the configuration process of at least one device into a series of higher-level intermediate configuration states between an initial configuration state and a desired configuration state. The transitions between respective configuration states can depend on the configuration status of at least one other network device.

The deployment can be coordinated by a central deployment softwaretool running on a central deployment network device which is connected to the target data network that is to be configured. The deployment is carried out based on a given specification of the desired network's respective configuration. a description of the desired network device configuration that was created by some network design tool, for example. The network configuration is given by the configuration of the network devices.

A central deployment software-tool receives the desired system description of the respective network, the desired network device configuration from a "system configuration tool", for example. For instance, by means of a configuration file, inter-process communication or such can be used. It coordinates the deployment of configuration parameters to the configurable network devices. It decides therefore which configurable network device(s) to be configured next and what next configuration state of to achieve. It can also assist in identifying devices on the network, in order to establish a 1:1 relationship between planned network devices in the system description of the network and an actual network device instance on the network.

Network device identification can be based on MAC addresses, LLDP/SNMP, ICMP, and the knowledge of the network topology from the system description, for example. If a device reachable on the network has an unambiguous correspondence with a planned configurable network device in the system description, the central deployment software-tool might suggest an assignment automatically. A central deployment software-tool might also maintain and store a representation of the system description, assignment of actual network devices to devices in the system description and the deployment progress of configurations to the network devices. Optionally, it notifies a system configuration tool about the deployment progress.

At least one specific type of network device is defined which is characterized by a series of pre-defined configuration steps—understood as a series of transitions between the series of subsequent configuration states of the respective network device. This information is as well provided to the central deployment software-tool as the required device-specific communication for deploying the desired configuration changes to the respective network device and as the required device-specific communication for determining the new configuration state of the network device.

The dependencies of transitions inbetween different configuration states of a respective network device on other network devices ensure that changes, particularly in logical connectivity between network devices as they can occur during network configuration, are performed in a consistent ordering.

A system description of a data or communication network which is provided to the central deployment software-tool can include following information:

The hardware (or the currently available subset if not all hardware has arrived yet) to which the desired configuration is to be deployed, including:
The network devices (D) to be configured,
The cabling establishing the physical links between the network devices,
Network devices (D, or "D<unit u>,<device number n>"), each of which
is of some device type (e.g., network switch, routing firewall, server PC, automation controller),
is associated a description of its desired target configuration,
provides a number of network interfaces (NI) (e.g., switch ports, PC network interface cards),
Links between those network devices, for example expressed by connections between the network interfaces (NI), where each connection potentially carries additional information about its target configuration (e.g., media type of the cable which physically represents the connection).

A method according to the present disclosure is, for example, a state-based deployment method. There is a structured (e.g., linear) arrangement of configuration states for each engineered network device. The set of configuration states and transitions between those configuration states on each network device can be represented by a graph or state machine.

At least some configuration states can have common semantics. For each planned network device, its configuration state is tracked individually. Exemplary subsequent configuration states including intermediate configuration states of a configurable network device could be:

"Device not yet identified"
"Device reachable and identified, but not configured"
"Device partially configured"

This state is a good example of a configuration state that can and should have device-specific intermediate configuration states. Intermediate configuration states express that a specific subset of functions/services of the device are provided/enabled.

"Device secured"
"Device ready for transit network traffic" (can also have sub-ordinated configuration states for example for specific protocols)
"Device fully configured"
"Error state"

The configuration states with common semantics can have the purpose of being presentable to a human. That is, a human checking the progress of deployment via the tool user interface can gain quick insight into the deployment progress. The human needs to know the meanings of only these few common, mentioned higher-level configuration states.

State changes inbetween subsequent configuration states of a network device are based on transitions. Each change of a configuration state is associated with a sequence of configuration actions respectively the deployment of respective configuration parameters to a respective network device. A sequence of configuration parameter to be deployed depends on the type of device. A respective deployment device driver deploys the respective configuration parameters to the respective network device in order to achieve the subsequent configuration state of the network device. Such a deployment device driver might for example be integrated into the central deployment software-tool An exemplary possibility to define a respective deployment schedule might look as follows. Firstly, a set of rules and facts is generated, based on the system description as received from the system configuration tool and the description of configuration states and transitions as supplied from the deployment device drivers of the involved network devices. Afterwards, a (partially) ordered list of actions is computed that lead from the current network configuration to the desired network configuration respectively desired network device configuration, where this schedule respects the rules and facts.

Then the planned actions and thereby the device configurations are deployed to the target network devices, as already described. This way, deployment schedules can be inferred by searching for valid schedules that are guided by the rule system. The solution can be computed for example alternatively by:

Search on the dependency graph,
Suitable formulation as a state machine,
Partial-order planning,
Petri nets, or
Logical reasoning, e.g., by running a logic program that conforms to an applicable calculus such as the Situation Calculus or an extension of it. Example reasoning languages are Golog, ConGolog, and IndiGolog, which are often implemented as Prolog programs. Transitions can then be represented by (exogenous) actions. Configuration properties of devices can be represented by fluents that assume certain values. States, finally, can subsume combinations of fluent values that are to hold in a state. The configuration states and substates are denoted by what for instance the Situation Calculus calls situations. The device drivers need to provide descriptions of states and transitions in the respective language/rule system. Vice versa, they will be called whenever an (exogenous) action is triggered.

The choice of the solution method or logic programming language dialect depends on the complexity of and requirements to the deployment model.

Such representation of devices (in terms of configuration states, transitions, offerings, etc.) furthermore makes it possible to simulate the existence of a device even if it is not (yet) available. This way, parts of a deployment can be run, unless the simulated device provides offerings that are required in the actual network being built up.

After a successfully completed sequence of configuration actions, a successful transition to the next subsequent configuration state of the respective network device is achieved. A failure might either result in the previous state or a special error state of the respective network device, depending on the realized state modeling and what the device driver returns as the new state. Failures can be reported to the user by means of a user interface. In the end of a successful network device configuration process according to the invention the entire network is fully configured. That is, all configurable network devices finally have reached the desired configuration state such as "device fully configured".

Thus a method for automatically configuring network devices of a data network according to a desired device respectively network configuration which is also considering dependencies inbetween the network devices during deployment is provided.

In an exemplary variant, at least once respective configuration parameters for a respective subsequent intermediate configuration state are deployed to a configurable network device. This has to be foreseen for the at least one network device whose configuration requires a pre-defined series of at least one intermediate configuration state inbetween the initial configuration state and the desired configuration state.

According to a further exemplary embodiment, at least one of the configurable network devices is from a further type of network devices, whose configuration requires a further pre-defined series of at least one intermediate configuration state inbetween the initial configuration state and the desired configuration state. Thus two or more types of configurable network devices requiring one or more respective intermediate configuration states during their respective configuration processes are foreseen. Theoretically, each device could be of a different type.

Following a further exemplary embodiment, a pre-defined intermediate configuration state is temporarily eliminated out of a series of two or more predefined intermediate configuration states if appropriate. If it is clear during the configuration process considering the actual network configuration that for example a row of two or more consecutive subsequent configuration states of a configurable network device does not interfere with the ongoing configuration process, it is appropriate either to deploy directly the parameters for the respective last configuration state of the row or to deploy this row step by step in a sequence without further consideration of a possible interference. Thus the deployment process can be accelerated in an advantageous way.

According to a further exemplary embodiment, respective configuration parameters for respective subsequent intermediate configuration states of different configurable network devices are deployed simultaneously if appropriate. Criterion for synchronously deploying is that no interference between the respective network devices occurs during deployment of the belonging configuration parameters. The deployment process can be accelerated in an advantageous way therewith.

Advantageously, a respective deployment device driver is foreseen for at least one of the configurable network devices for deploying respective configuration parameters thereto via the data network.

A deployment device driver is capable of achieving a desired configuration or some intermediate configuration state for one specific type of network device (e.g., some switch, routing firewall, or an automation controller). It is capable of realizing transitions by changing the configuration of a network device from one configuration state to the subsequent configuration state. It is therefore, for example, capable of:

Receiving the desired subsequent configuration state,
Identifying a network device based on the received configuration,
Interpreting the desired configuration parameters from the system description,
Extracting the configuration parameters to be changed for the specific device and desired subsequent state, that is, determining what needs to be configured,
Deploying the respective configuration parameters to the target device by means of network communication, (e.g., via SNMP (Simple network Time Protocol), Netconf, WMI (Windows Management Configuration), Web services, DHCP (Dynamic Host Configuration Protocol) options, command-line interface via protocols such as Telnet or SSH (Secure Shell), etc.). This deployment typically involves a sequence of protocol-specific (low-level) communication steps. This sequence and the exact choice of parameters transmitted are encapsulated by the deployment device driver. Executing this sequence of low-level deployment steps result in the desired state change for the target device.
Reading the current device configuration from the target device by means of network communication,
Validating that the current network device configuration corresponds to the desired one,
Determining the actual network device configuration state of the device from its current configuration,
Informing the central deployment software-tool about success/failure of the latest configuration step, the deployment state of the respective network device, and the current detailed configuration of the network device.

A deployment device driver can provide a description of states, transitions, prerequisites and/or post conditions that can be interpreted by the central deployment software-tool. It is capable of assisting in network device discovery, starting from the represented device. For example, the deployment device driver of a network switch can deliver a list of adjacent network devices by providing LLDP (Link Layer Discovery Protocol) results for the ports of the switch. Furthermore a deployment device driver is for example, capable of recognizing the represented device type, given a set of features of a newly discovered network device (e.g., MAC (Media Access Control) address, SNMP MIB (management Information Base) description, WMI description, service/port scan).

Thus, it can be ensured in an easy way that the relevant communication respective deployment protocols for the respective network devices are observed.

According to an exemplary embodiment, the deployment progress is displayed on a user interface. A user interface might be foreseen to textually or graphically present the deployment progress to a user.

The deployment progress might refer to the configuration status of the entire data network. For example, the following network configuration states might be foreseen:
"not started",
"not reachable" (if nothing is reachable from the central deployment software-tool),
"in progress" (as long as there is at least one device that is not fully configured),
"fully completed" (if all devices are fully configured),
"error" (in case of any error).

The deployment progress might also refer to single network devices with respective comparable configuration states. According to an exemplary embodiment of the user interface, it provides several views of the deployment progress at the same time. Example views are tree views, list views and/or device graphs.

A user interface might enable a user to assign not yet assigned network devices to devices in the system description, in order to give device placeholders in the system description the identity of an actually present network device instance. Optionally, a user interface can present to the user what manual intervention needs to be done if some configuration step cannot be performed automatically. This might be the case for example if some network device has not yet been connected to the network or if a network device technically requires intervention beyond reach of the network and an operator needs to connect with some specialized configuration hardware. Thus, a user interface might also be foreseen for visualizing conflicting conditions and/or deployment errors. As indicated before according to the invention it is also foreseen that the deployment progress is manually influenced.

According to another exemplary embodiment, the configuration of a respective subsequent configuration state of a respective network device requires a network device internal pre-defined series of sub-ordinated configuration states until the respective subsequent configuration state is achieved. Subordinated configuration states do not have common semantics necessarily. This can help to resolve dependencies or avoid deadlocks during the deployment process (e.g., partial configuration of device X requires connected switch Y to have a partial configuration with "no VLAN configured" yet). From a modeling point of view, a series of sub-ordinated configuration states can be modeled also in parallel, if appropriate.

According to a further exemplary embodiment, the central deployment network device with central deployment tool running thereon is one of the at least two configurable network devices. Thus, a special hardware for the central deployment network device is avoided in an advantageous way. It is also an option to distribute a central deployment software-tool on several network devices.

According to a further exemplary embodiment, the desired network configuration respectively system description is defined by use of a system configuration tool. Such a tool maintains a system description of a network or networked automation system, where the system contains a set of network devices, their types and desired configurations, and the physical connectivity between the network devices.

Following another exemplary embodiment, at least one decentralized deployment network device with a sub-ordinated deployment software-tool running thereon is foreseen which is coordinated by the central deployment network device and which itself coordinates configuring of a further subgroup of configurable network devices respectively the corresponding unit of the network/networked automation system.

A sub-ordinated deployment software-tool is a subordinate instance of the central deployment software-tool that receives the system description (or parts of it) therefrom and is responsible of achieving the target network device configuration for the corresponding unit of the network/networked automation system. It is required only if the corresponding network unit is not directly connected to the network part in which the central deployment software-tool resides.

The communication between central deployment software-tool and sub-ordinated deployment software-tool can be tunneled securely through a potentially insecure network, for example the Internet. In single-unit networks/automation systems, there is no need for sub-ordinated deployment softwaretool.

If there is no communication channel between central deployment software-tool and sub-ordinated deployment software-tool—for instance because there is no Internet connection between the respective network device or it first has to be configured by the sub-ordinated deployment software-tool on one side—communication could be substituted by transporting a portable memory from the central deployment network device to the decentralized deployment network device.

A sub-ordinated deployment software-tool can be nested/hierarchically organized. It can use another sub-ordinated deployment software-tool to configure sub-units of the network/networked automation system. A sub-ordinated deployment software-tool is either
- autonomous (=independent) and in this case capable of doing exactly the same things as the central deployment software-tool with regard to deployment, or
- a slave and therefore told the deployment schedule by the central deployment software-tool for the parts of the system exactly it is responsible of.

A sub-ordinated deployment software-tool informs the central deployment software-tool (or a superordinate sub-ordinated deployment software-tool, respectively) about the configuration status in the assigned network device. If there are dependencies to the configuration states of devices outside the assigned network device, the sub-ordinated deployment software-tool additionally requests configuration states for the rest of the system from the central deployment software-tool (or a superordinate sub-ordinated deployment software-tool, respectively).

A sub-ordinated deployment software-tool could also be installed on one of the configurable network devices as a special deployment step. This "reproduction" of the deployment tool can be an option if the configuration of network infrastructure devices will inevitably lead to a network topology in which at least one part of the network is isolated (e.g., due to VLANs, security measures). Then, the deployed sub-ordinated deployment software-tool can finalize the configuration of the isolated part of the network.

A system is also disclosed for automatically configuring network devices of a data network according to a desired device configuration,
- wherein the data network comprises at least two configurable network devices,
- wherein configuration parameters are deployable over the data network to the configurable network devices,
- wherein the configurable network devices are configurable from a respective initial configuration state to a respective desired configuration state.

In an exemplary system, at least one of the configurable network devices is from a first type of network devices, whose configuration requires a predefined series of at least one intermediate configuration state in between the initial configuration state and the desired configuration state, and includes a central deployment network device with a central deployment software-tool running thereon which is configured to initiate or perform a method according to the present disclosure.

Exemplary functionality and advantages of such a system correspond to the functionality and advantages of the method as already described.

Figure 1:
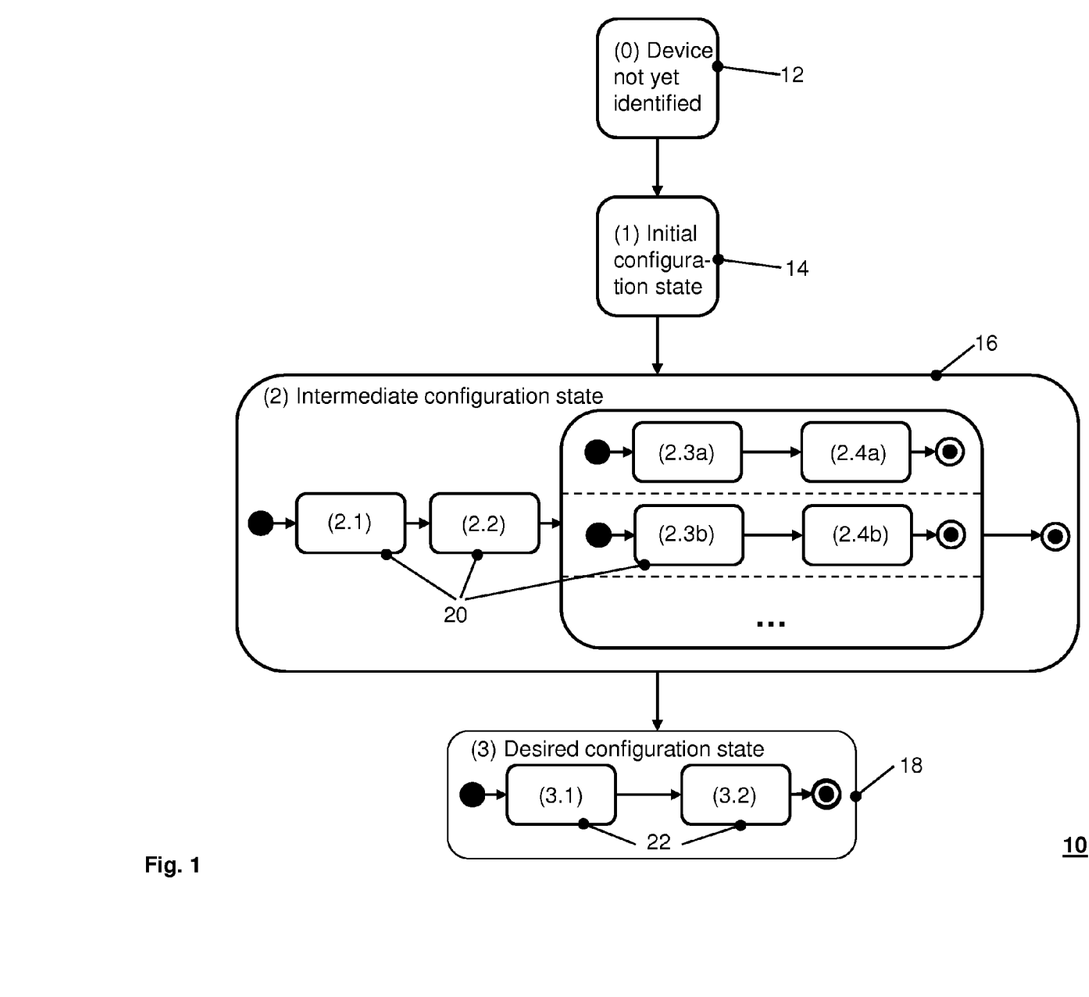
FIG. 1 shows an exemplary series of subsequent configuration states of a network device.

FIG. 1 shows an exemplary series 10 of subsequent configuration states of an exemplary network device of a not shown data network. In the first stage 12, the configurable network device is not yet identified. After identifying, for example by use of a deployment device driver, it is reachable by the central deployment software tool, which afterwards identifies the initial configuration 14. During the deployment process the central deployment software-tool decides to deploy the configuration parameters for the subsequent intermediate configuration state 16 since there is actually no interference with other network devices to be configured.

After applying the respective configuration parameters, a device internal pre-defined series of sub-ordinated configuration states 20, 22 is applied before the subsequent configuration state 16 is achieved as indicated with the dotted circle on the right side of the figure. The series of sub-ordinated configuration states includes in this example the steps 2.1-2.4. Examples for those sub-ordinated configuration states can be for example:
- 2.1: "IP address not yet configured"
- 2.2: "IP address configured"
- 2.3*a*: "Syslog target not yet configured"
- 2.3*b*: "SNMP traps not yet configured"
- 2.4*a*: "Syslog target configured"
- 2.4*b*: "SNMP traps not yet configured"

Configuration states can have sub-ordinated configuration states 2.3 and 2.4 without common semantics, if required. This can help to resolve dependencies or avoid deadlocks during the deployment process (e.g., partial configuration of device X requires connected switch Y to have a partial configuration with "no VLAN configured" yet). From a modelling point of view, subordinated configuration states can be modelled also as parallel sub-ordinated configuration states, if desired. Parallel sub-ordinated configuration states do not impose a certain ordering unless the ordering ensures the correctness or time-efficiency of the system deployment schedule.

Configuration states and intermediate configuration states of a network device can be characterized by a description of connectivity that the network device provides and by offerings/features of the network device.

Basic connectivity is given by physical connectivity (e.g., cabling between ports or wireless connections). Connectivity can further be based on several logical layers (e.g., protocol layers) that depend on each other. The ISO/OSI model is a good reference model for this, but is not the only one. For instance, there may be a physical connection between two ports of a switch (layer 1), but due to VLANs there is no direct connectivity between the two ports.

Offerings/features are services that are provided, either globally (provided to all reachable network devices) or to a subset of network devices. For example: A node with a DHCP server will offer the service "DHCP", once that the node is in a configured state (e.g., that node is "fully configured") or a SNTP time server will offer the service "SNTP", once that node is in a configured state (e.g., that node is "fully configured"). This way, offerings of a device can be regarded as assertions/postconditions of successful transitions into the corresponding states.

As a generalization from offerings of the network device, the network device may have other time-varying configuration properties that are made accessible to the central deployment network device by the deployment device driver and that are not hidden by the responsible deployment device driver. This can be all configuration parameters of a network device if required for guarding the transitions of other devices. For example:

DHCP option that is enabled on a switch
Running Syslog server on a server node
Connectivity matrix between switch ports (e.g., expressing VLAN connectivity)

The descriptions of configuration states and offerings are provided by the deployment device drivers, as instantiated based on the system description. For example, a server node is described to run a DHCP server on it. The device driver for server nodes recognizes this and adds the service/offering "DHCP" to all states in which the DHCP will be running, once the device driver will have configured the server node to start the DHCP function. This offering is then ubiquitously available.

Transitions to subsequent configuration states of network devices can depend on prerequisites/conditions. Prerequisites can be configuration states of other devices or non-local configuration states that express the progress of configuration deployment. A transition to a new state cannot be taken unless, for example, all preconditions are satisfied.

Preconditions are based on connectivity as well as offerings and configuration properties of devices that need to be satisfied or to have certain values. Preconditions can be combined (e.g., by logical operators, mathematical formulas etc.). This way, preconditions express a partial description of a required configuration of the network configuration.

Figure 2:
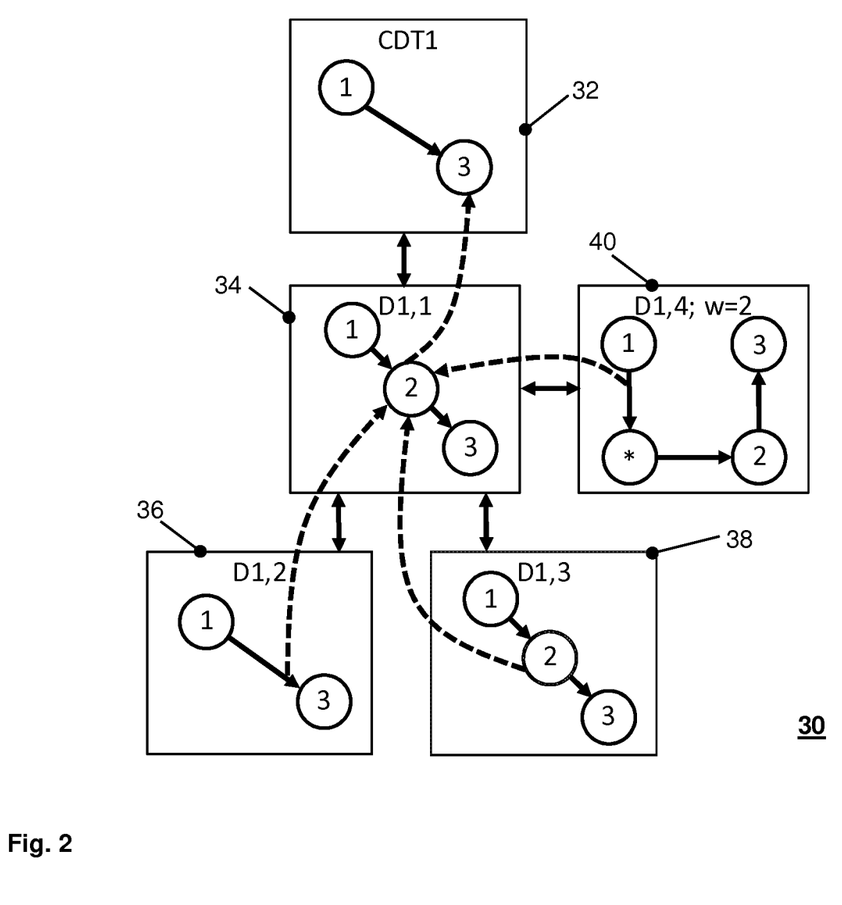
FIG. 2 shows an exemplary deployment scheme.

FIG. 2 shows an exemplary deployment scheme in a sketch 30. An exemplary central deployment network device 32 is connected by network connections with a first 34, a second 36, a third 48 and a fourth 40 configurable network device. All network devices include an initial configuration state such as "device reachable, but not configured"—marked with a "1"—and a desired configuration state such as "device fully configured"—marked with a "3". The central deployment network device 32 and the second configurable network device 36 do not include any intermediate configuration states inbetween, whereas the second 34 and the third 36 configurable network device are characterized by one intermediate configuration step such as "device partly configured"—marked with a "2".

Configurable network devices with major or critical functions can have higher, non-default weights as indicated with "w=2" for the fourth device 40. Whenever the deployment process can continue with several configuration actions (i.e., transitions) the ones on prioritized devices should/must be preferred. Instead of numeric weights, labels with a reserved semantic are also possible, such as "PREFERRED_DEVICE" or "PROCESS-CRITICAL_DEVICE".

Figure 3:
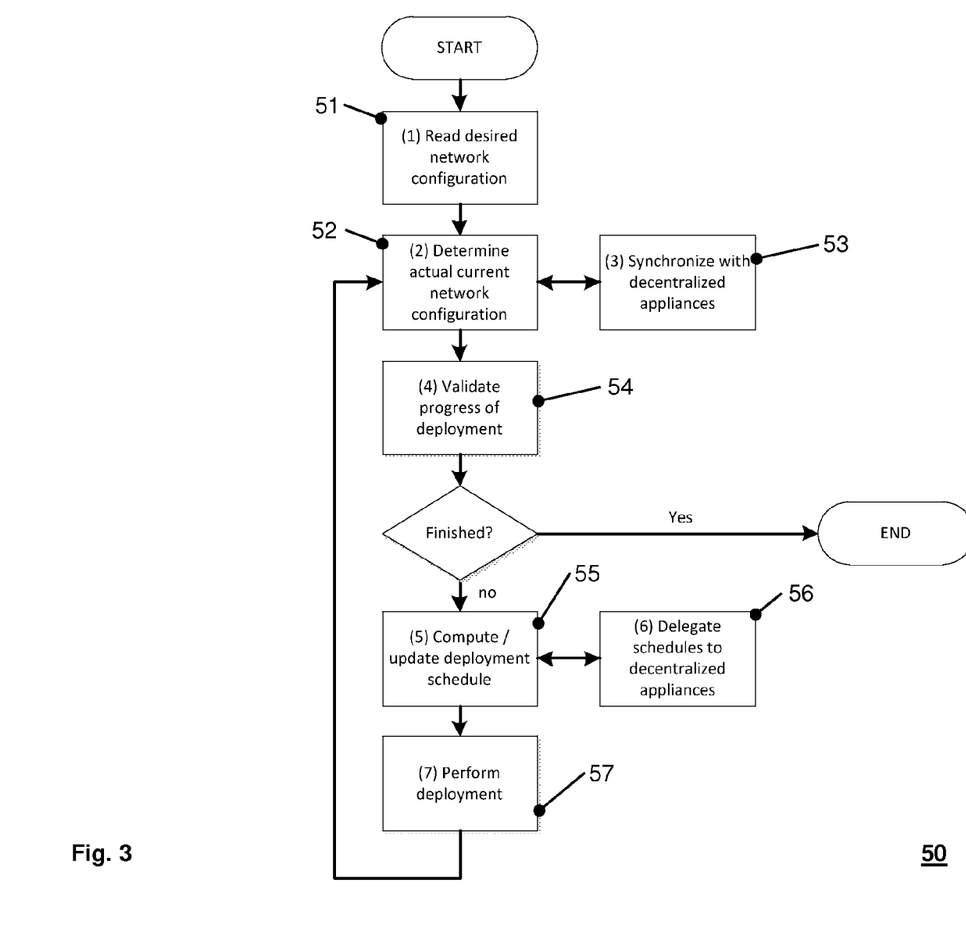
FIG. 3 shows a function graph of deployment.

FIG. 3 shows a function graph of deployment 50. It includes seven main steps 51, 52, 53, 54, 55, 56 and 57 of the method for automatically configuring network devices.

In a first step 51 the central deployment software-tool reads the system description (i.e., the desired network configuration to be established). This can be done, for instance, from a description file or by communication with a system configuration tool that provides the system. In case of a sub-ordinated deployment software-tool it receives the system description by communication with the central deployment software-tool.

In a second step 52 the central deployment software-tool updates the model of the current (=actual) network by means of network communication via the corresponding device drivers and by network device discovery. Device discovery means that the network is scanned for not yet identified devices and devices on the boundaries of already discovered network devices. It is assumed that from discovered devices their identity can be matched with devices in the system description. In case of a sub-ordinated deployment software-tool it determines the current network configuration for the reachable part of its network devices respectively the further subgroup of configurable network devices.

In a third step 53 the central deployment software-tool will request the current network configurations from a sub-ordinated deployment software-tool if present—to determine the network configuration of the full, distributed network. Accordingly, a sub-ordinated deployment software-tool sends the belonging configuration of the managed network devices to the central deployment software-tool.

If there are sub-ordinated deployment software-tools that autonomously determine deployment schedules in a nested/hierarchical unit setup, they will be given the current network configurations of all other network devices as well.

In a fourth step 54 the central deployment software-tool determines the states of all currently identified network devices, preferably by using the deployment device drivers. It compares these determined actual configuration states with the respective desired configuration states. If all configurable network devices are fully configured as desired, the deployment is completed. Elsewise, the deployment continues with the next step.

In a fifth step 55 the central deployment software-tool selects the set of transitions that can be taken, given the determined configuration states of the configurable network devices and taking respective priorities into consideration. As many transitions on different configurable network devices are triggered as possible from the current configuration states, as long as they do not lead to violations of preconditions within this set of transitions.

In a sixth step 56 the central deployment software-tool will distribute the subset of actions that apply to the further subgroup(s) of configurable network devices coordinated by the respective sub-ordinated deployment softwaretool. Accordingly the respective sub-ordinated deployment software-tool receives the planned actions/deployment schedule from the central deployment software-tool.

In a seventh step 57 the respective network device drivers take over the task of realizing the transitions inbetween the respective configuration states on the different network devices. They deploy configuration changes to the network devices by translating the required sequences of actions that lead to the respective subsequent configuration state into protocol-specific communication with the target network devices.

In case of an autonomous sub-ordinated deployment software-tool step 1 corresponds to step 1 of a "normal" sub-ordinated deployment softwaretool and steps 2, 4, 5, 6, 7 to the steps of a central deployment software-tool. In step 3 the autonomous sub-ordinated deployment software-tool sends the configuration of the managed units respectively the further subgroup of configurable network devices to the central deployment software-tool or a supervising sub-ordinated deployment software-tool.

If a further sub-ordinated deployment software-tool exists the subordinated deployment software-tool will synchronize the current network configurations with those sub-ordinated deployment software-tools to determine the network configuration of the full, distributed network.

Figure 4:
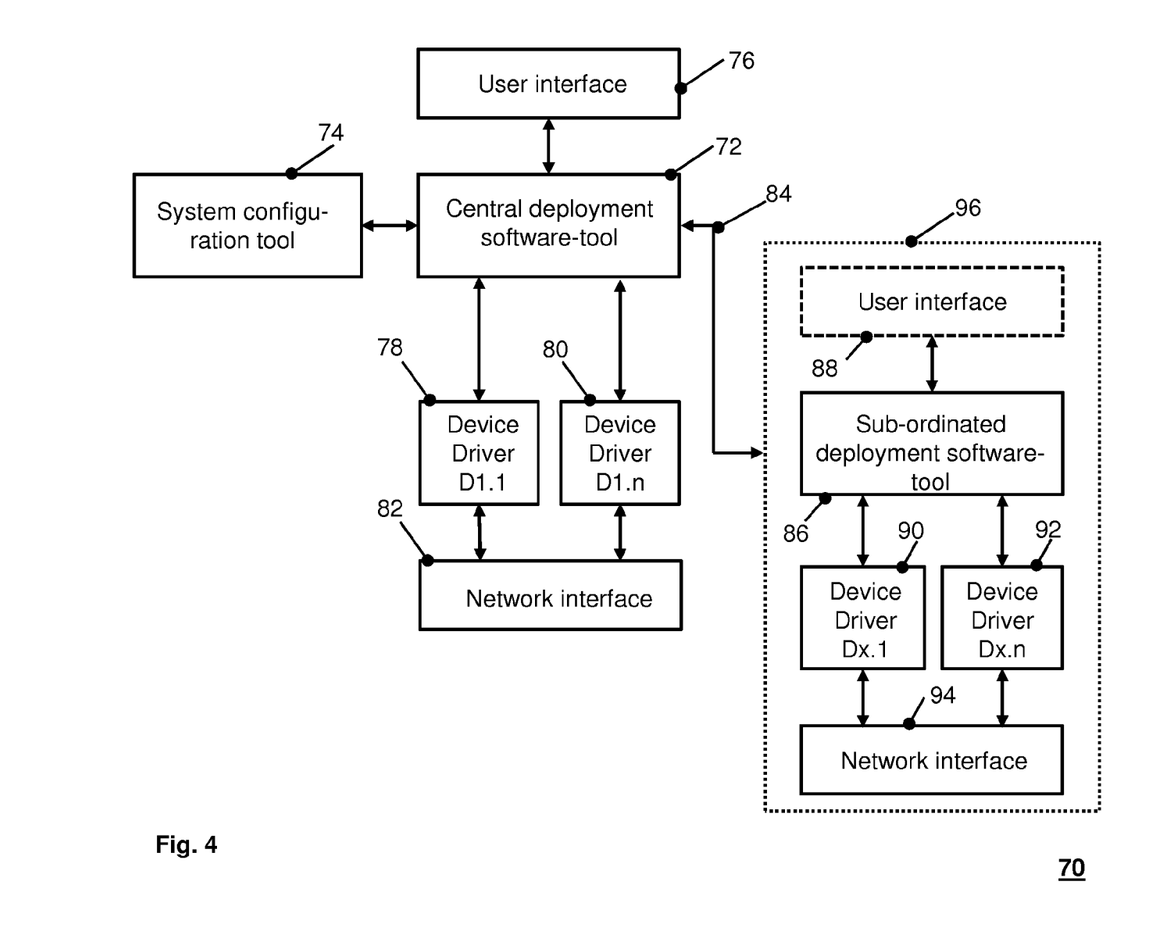
FIG. 4 shows an exemplary conceptual system architecture.

FIG. 4 shows an exemplary conceptual system architecture in a sketch 70. A central deployment software-tool 72 is connected with a system configuration tool 74 and a user interface 76. The system configuration 74 tool maintains a system description of a network or networked automation system and provides this together with the desired network configuration to the central deployment software-tool 72. The user interface 76 is foreseen to present the deployment process to the user and allows manual interaction with the deployment system, for example in case of a deployment error. The central deployment software-tool 72 determines respective configuration parameters to be deployed to the configurable network devices. Deployment device drivers 78, 79 are foreseen to deploy those configuration parameters thereto and communicate with the respective network devices. A network interface 82 is connected to the target network to be configured and is capable of achieving network communication with a number of target devices. It can be realized for example by an Ethernet interface of the host device respectively the central deployment network device, where the central deployment software-tool 72 is running on.

The dotted box with reference number 96 shows an optional part of the system architecture for a sub-ordinated deployment software-tool. This is in principal similar to the (central) part of the system architecture described before, so it can include a decentralized deployment software-tool 86, respective device drivers 90, 92, a network interface 94 and a user interface 88. It is possible to foresee several of those sub-ordinated deployment software-tools for several sub-groups of configurable network devices. The system configuration tool 74 maintains the system description also for the sub-ordinated sub-groups of configurable network devices.

Figure 5:
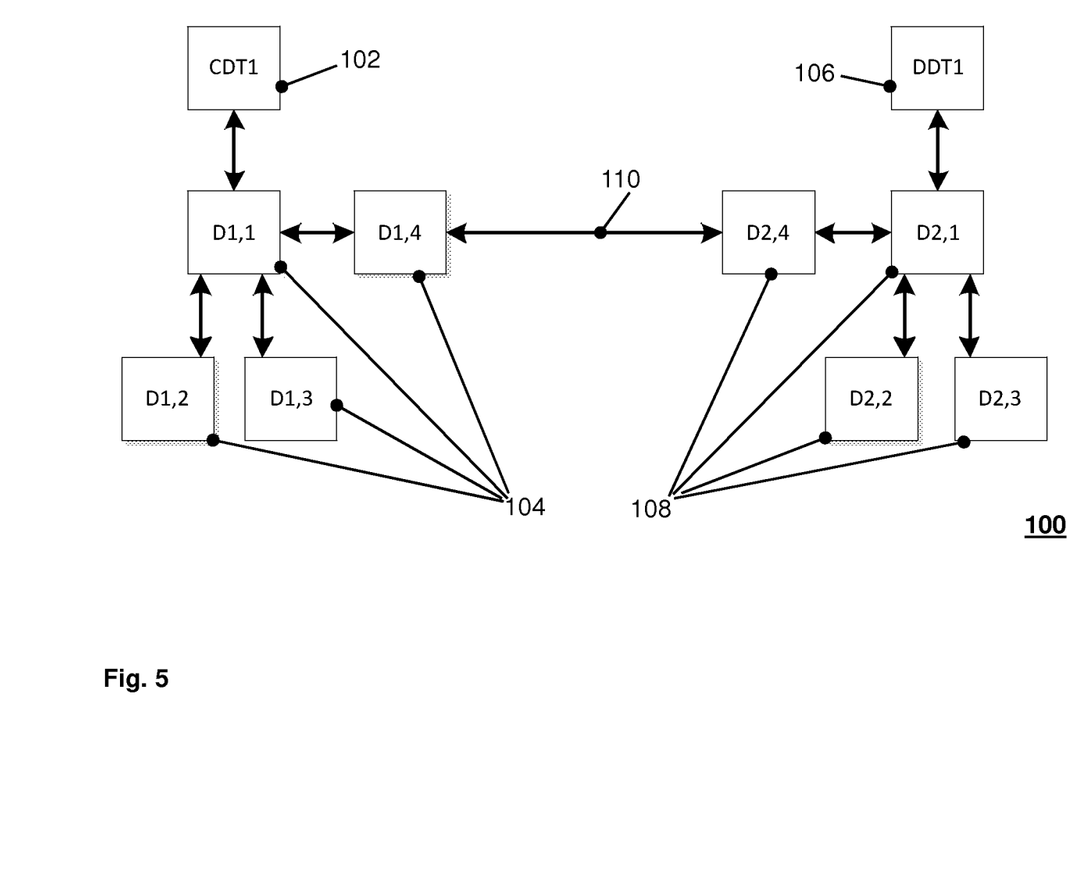
FIG. 5 shows an exemplary device connectivity graph.

FIG. 5 shows an exemplary device connectivity graph 100. A central deployment network device 102 is connected to several configurable network devices 104, which are referenced with D1,2, D1,2, D1,3, D1,4. A decentralized deployment network device 106 is connected to several configurable network devices 108, which are referenced with D2,2, D2,2, D2,3, D2,4. The communication between both parts of the network is realized in between network devices D1,4 and D2,4, for example tunnelled through a potential untrusted network ibetween them.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS 10 exemplary series of subsequent configuration states of a network device
12 configuration state device not yet identified
14 initial configuration state
16 intermediate configuration state
18 desired configuration state
20 first series of sub-ordinated configuration states
22 second series of sub-ordinated configuration states
30 exemplary deployment scheme
32 central deployment network device
34 first configurable network device
36 second configurable network device
38 third configurable network device
40 fourth configurable network device
50 function graph of deployment
51 exemplary first step: read desired network configuration
52 exemplary second step: determine actual current network configuration
53 exemplary third step: synchronize with decentralized appliances
54 exemplary fourth step: validate progress of deployment
55 exemplary fifth step: compute/update deployment schedule
56 exemplary sixth step: delegate schedules to decentralized appliances
57 exemplary seventh step: perform deployment
70 exemplary conceptual system architecture
72 central deployment software-tool
74 system configuration tool
76 user interface of central deployment software-tool
78 first deployment device driver for central deployment software-tool
80 second deployment device driver for central deployment software-tool
82 network interface for central deployment software-tool
84 communication channel
86 decentralized deployment software-tool
88 user interface of sub-ordinated deployment software-tool
90 first deployment device driver for sub-ordinated deployment software-tool
92 second deployment device driver for sub-ordinated deployment software-tool
94 network interface for sub-ordinated deployment software-tool
96 optional sub-ordinated part of system architecture
100 exemplary device connectivity graph
102 central deployment network device
104 configurable network devices
106 decentralized deployment network device
108 subgroup of configurable network devices
110 communication channel

The invention claimed is:

1. A method for automatically configuring network devices of a data network which includes at least two configurable network devices whose configuration parameters are deployable over the data network to configure the configurable network devices from a respective initial configuration state to a respective desired configuration state, at least one of the configurable network devices being from a first type of network devices whose configuration requires a predefined series of at least one intermediate configuration state in between the initial configuration state and the desired configuration state, the method comprising:
   operating a central deployment network device with a central deployment software-tool running thereon to perform or initiate the following:
   determining an actual state of each of the configurable network devices;

comparing the actual states with respective desired states of the configurable network devices;

in case of a difference, determining at least one respective subsequent intermediate or respective subsequent desired configuration state for at least one of the configurable network devices wherein the actual states of the configurable network devices are considered;

deploying respective configuration parameters for the respective subsequent intermediate or desired configuration state to the respective configurable network device; and repeating the operation until all configurable network devices are configured as desired.

2. The method according to claim 1, comprising:

deploying at least once, respective configuration parameters for a respective subsequent intermediate configuration state to a configurable network device.

3. The method according to claim 1, wherein at least one of the configurable network devices is from a further type of network devices, whose configuration requires a further pre-defined series of at least one intermediate configuration state in between the initial configuration state and the desired configuration state.

4. The method according to claim 1, comprising:

temporarily eliminating a pre-defined intermediate configuration state out of a series of two or more pre-defined intermediate configuration states, when appropriate.

5. The method according to claim 1, comprising:

deploying respective configuration parameters for respective subsequent intermediate configuration states of different configurable network devices simultaneously, when appropriate.

6. The method according to claim 1, wherein a respective deployment device driver is provided for at least one of the configurable network devices for deploying respective configuration parameters thereto via the data network.

7. The method according to claim 1, comprising:

displaying deployment progress on a user interface.

8. The method according to clam 7, comprising:

manually influencing the deployment progress.

9. The method according to claim 1, wherein the configuration of a respective subsequent configuration state of a respective network device requires a network device internal pre-defined series of sub-ordinated configuration states until a subsequent configuration state is achieved.

10. The method according to claim 1, wherein the central deployment network device with central deployment tool running thereon is one of the at least two configurable network devices.

11. The method according to claim 1, comprising:

defining data of a desired network configuration with a system configuration tool.

12. The method according to claim 1, wherein at least one decentralized deployment network device with a sub-ordinated deployment software-tool running thereon is coordinated by the central deployment network device which itself coordinates configuring of a further subgroup of configurable network devices.

13. The method according to claim 12, comprising:

deploying installment of the sub-ordinated deployment software-tool on one of the configurable network devices.

14. A system for automatically configuring network devices of a data network having at least two configurable network devices whose configuration parameters are deployable over the data network to the configurable network devices, the configurable network devices being configurable from a respective initial configuration state to a respective desired configuration state, the system comprising:

at least one configurable network device of a first type of network devices, whose configuration requires a pre-defined series of at least one intermediate configuration state in between an initial configuration state and a desired configuration state; and a central deployment network device with a central deployment software-tool running thereon which is configured to initiate or perform computer implemented functions which include:

determining an actual state of each of the configurable network devices;

comparing the actual states with respective desired states of the configurable network devices;

in case of a difference, determining at least one respective subsequent intermediate or respective subsequent desired configuration state for at least one of the configurable network devices wherein the actual states of the configurable network devices are considered;

deploying respective configuration parameters for the respective subsequent intermediate or desired configuration state to the respective configurable network device; and repeating the operation until all configurable network devices are configured as desired.

15. The system according to claim 14, wherein at least one of the configurable network devices is from a further type of network devices, whose configuration requires a further pre-defined series of at least one intermediate configuration state in between the initial configuration state and the desired configuration state.

16. The system according to claim 15, comprising:

a user interface for a respective deployment device driver for at least one of the configurable network devices for deploying respective configuration parameters thereto via the data network.

17. The system according to claim 1, comprising:

a user interface for displaying deployment progress.

18. The system according to claim 17, wherein the configuration of a respective subsequent configuration state of a respective network device requires a network device internal pre-defined series of sub-ordinated configuration states until a subsequent configuration state is achieved.

19. The method according to claim 18, wherein the central deployment network device with central deployment tool running thereon is one of the at least two configurable network devices.

20. The method according to claim 19, wherein at least one decentralized deployment network device with a sub-ordinated deployment software-tool running thereon is coordinated by the central deployment network device which itself coordinates configuring of a further subgroup of configurable network devices.

* * * * *